M. & W. P. BALES.
Corn Harvester.
No. 86,203.
Patented Jan. 26, 1869.
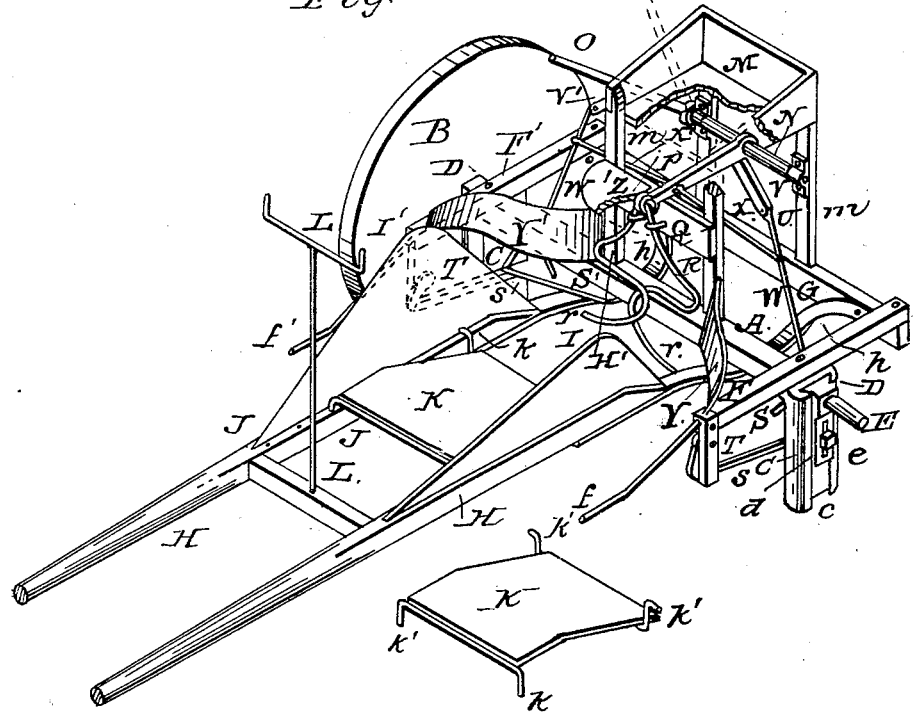
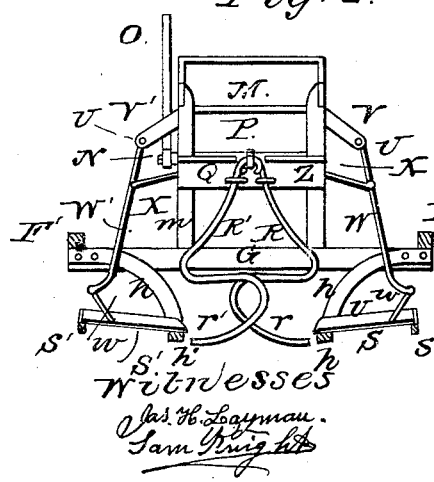
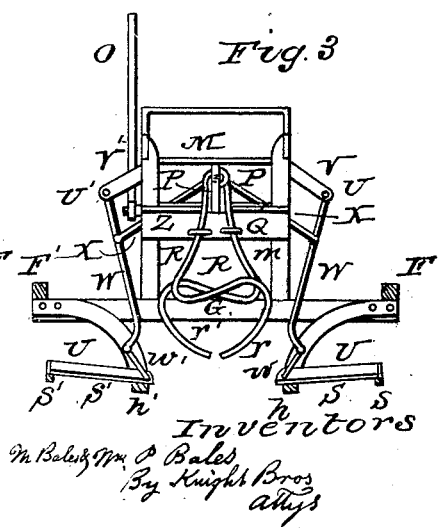

MOSES BALES AND WILLIAM P. BALES, OF LONDON, OHIO.

Letters Patent No. 86,203, dated January 26, 1869.

IMPROVEMENT IN CORN-HARVESTERS.

The Schedule referred to in these Letters Patent and making part of the same.

*To whom it may concern:*

Be it known that we, MOSES BALES and WILLIAM P. BALES, both of London, Madison county, Ohio, have invented certain new and useful Improvements in Corn-Harvesters; and we hereby declare the following to be a full, clear, and exact description thereof, reference being had to the accompanying drawings, making part of this specification.

Our invention relates to that class of agricultural implements commonly known as corn-harvesters; and The first part of our improvements consists in a peculiarly-constructed dropping-attachment, by which the driver is enabled to deposit the several corn-stalks upon the ground as rapidly as the receptacle which is provided for them upon the machine becomes filled.

The second part of our improvements consists of a raking-attachment, which is operated by the driver in such a manner as to free the knives of the severed stalks, and thus prevent them deranging the machine.

The third part of our improvements relates to a shiftable platform, which can be adjusted longitudinally of the implement, for a purpose which will be hereafter fully described.

The fourth part of our improvements relates to the axle of the machine, which can be adjusted vertically, so as to permit of the stalks being cut at different heights above the ground.

In the accompanying drawings—

Figure 1 is a perspective view of a corn-harvester embodying our improvements, one of the ground-wheels being removed, and a portion of the driver's seat being broken away, so as to exhibit more clearly the operative parts of the machine.

Figures 2 and 3 are transverse sections, taken immediately in the rear of the axle of the machine, of which figures one shows the condition of the dropping-attachment when the operating-lever O is in the position shown in fig. 1, while fig. 2 exhibits the condition of said attachment when the lever is elevated to the position indicated by the dotted red lines in fig. 1.

A represents the axle of the machine, which is supported upon the ground-wheels B, and said axle can be adjusted to the desired height by the following devices:

Projecting downwardly from each end of the axle, are hangers C, which are provided with longitudinal grooves $c$, whose sides are undercut, as shown, and these grooves are traversed by blocks D, from which the spindles E of the axle project.

The blocks D are slotted at $d$, and they are secured at any desired position by the set-screws $e$, which engage with the hangers C.

This adjusting-device permits of the machine being either elevated or depressed, in order that the corn-stalks may be severed at a greater or less height from the ground.

Attached to the axle A are two dividers or gatherers, F F', whose rear ends are united by a cross-beam, G, while their front ends are furnished with fingers $f f'$, which serve to elevate any leaning or prostrate corn, and restore it to a proper position to be operated on by the knives.

The thills or shafts H H' are connected to the cross-beam G by means of the curved bars $h\ h'$, and these thills carry two outwardly-flaring spreaders I I'.

Apertures J, in the thills H H', prermit of the shiftable platform K being adjusted longitudinally of the machine, by simply inserting the legs $k$ of said platform in either of these apertures.

The rear end of the platform has hooks $k'$, which rest upon the top of the thills.

The object of this platform is to support the heads of the corn-stalks, after they have been severed by the knives, and, by rendering said platform shiftable, it can be adjusted to suit corn-stalks of different lengths.

Projecting upwardly from the forward part of the machine is a forked rod, L, which prevents the lines or reins, by which the horse is guided, becoming entangled with the load on the implement.

The posts $m$, which support the driver's seat M, afford journal-bearing for a rock-shaft, N, one end of which has secured to it the lever O, with which the driver is enabled to operate both the dropping and raking-attachment, the former of which is arranged in the following manner:

The rock-shaft N has secured, near its mid-length, an arm, P, whose free end has an eye, $p$, with which are engaged two bars, R R', that are bent in the manner shown in the different drawings.

These bars R R' are adapted to play freely within the staples or guides Q, and when the arm P is depressed, as shown in figs. 1 and 2, the hooked extremities $r\ r'$ of said bars serve to support the buts of the corn-stalks, but, as soon as the said arm P is elevated, the rods R R' assume the position represented in fig. 3, and, in so doing, deposit the severed stalks upon the ground.

It is to be understood that this elevation and depression of the arm P is effected by the driver operating the lever O whenever the receptacle becomes filled with stalks, it being understood that said receptacle is formed by the spreaders I I', shiftable platform K, and hooked bars R R', $r\ r'$.

S S' are the knives, whose outer ends are connected to arms $s\ s'$, that are pivoted to the frame of the machine at T, and the inner ends of said knives, which rest upon the bars $h\ h'$, are somewhat lower than the outer ends.

The knives, instead of being attached at right angles to the arms $s\ s'$, are placed obliquely thereto, so that their under ends shall project toward the rear of the machine, by which means said knives are caused to act with a shearing or carving-cut on the stalks.

The pivoted arms $s\ s'$ permit of the knives being elevated a slight distance, as soon as they come in contact with the standing stalks, which enables the knives to act upon the stalks in the most effective manner.

The rear sides and outer ends of the knives are provided with guards, U, which prevent the stalks sliding off the knives.

The knives are freed of the stalks at the proper moment by means of rakes, which are arranged in the following manner:

Attached to the sides of the driver's seat are two brackets, V V', to which are suspended, at $v\ v'$, rods W W', whose free ends have pivoted to them tines $w\ w'$, which are adapted to sweep the upper surface of the knives.

The rods W W' are operated by links X X', which connect said rods with the arm P of the rock-shaft N.

Y Y' are sheet-metal screens or fenders, which extend from the forward ends of the gatherers F F' to the posts $m$, which support the driver's seat, and these fenders not only incline the stalks in a proper manner for the knives to act on them, but they also prevent the heads of the stalks falling over and becoming entangled with the operating-parts of the implement.

Z is a support for the driver's feet.

This implement is placed in the field in such a manner as to compel the horse to walk between two rows of standing corn, and, as the machine is drawn forward, the stalks are brought between the dividers F F', spreaders I I', and fenders Y Y', by which means the stalks are inclined in the proper manner for the knives S S' to operate upon them, and, as soon as the stalks are severed, they fall over into the receptacle I I', K, R R', $r\ r'$.

When the receptacle has been filled, the driver elevates the lever O to the position indicated by the dotted red lines in fig. 1, which act not only empties the receptacle, by bringing the rods R R' to the position shown in fig. 3, but it also causes the tines $w\ w'$ to sweep the knives, and thereby rake off the buts of the stalks.

As soon as the receptacle has been thus emptied, a reverse movement of the lever O restores the dropping- and raking-attachments to their original positions.

The dropping and raking-attachments need not be used together, unless desired, as the machine will operate very well with the raking-attachment omitted.

We claim herein as new, and of our invention—

1. The dropping-attachment to a corn-harvester, consisting of the rock-shaft N, lever O, arm P $p$, curved bars R R', $r\ r'$, and guides Q, the whole being combined to operate substantially as herein described and set forth.

2. The combination, substantially as described, of the rock-shaft N, lever O, arm P $p$, vibrating rods W W', pivoted tines $w\ w'$, and links X X', for the purpose specified.

3. The provision, in a corn-harvester, of the shiftable platform K, $k\ k'$, which is adapted to be adjusted longitudinally of the implement, for the object described.

4. We are aware that devices have been used for regulating and adjusting the axles of vehicles of different kinds to any desired height, and therefore do not claim this as part of our invention; but we do claim the combination of the standard C, block D, containing the spindle E, the groove $c$, the plate $d$, and set-screw $e$, when constructed and arranged substantially in the manner and for the purposes set forth.

5. The combination of the dropping-attachment N O, P $p$, R R', $r\ r'$, Q, and raking-attachment W W', $w\ w'$, X X', for the purpose explained.

In testimony of which invention, we hereunto set our hands.

MOSES BALES.
WILLIAM P. BALES.

Witnesses:
GEO. H. KNIGHT,
JAMES H. LAYMAN.